(12) United States Patent
Kalweit et al.

(10) Patent No.: US 12,472,695 B2
(45) Date of Patent: Nov. 18, 2025

(54) ANCHORS AND SKIRTS TO REDUCE PART WARPING

(71) Applicant: MARKFORGED, INC., Waltham, MA (US)

(72) Inventors: Nicholas Kalweit, Cambridge, MA (US); Corey Hazeltine Walsh, Belmont, MA (US); Harrison Davis, Boston, MA (US); Vinay Francis Rodrigues, Watertown, MA (US); Agamemnon Despopoulos, Cambridge, MA (US)

(73) Assignee: MARKFORGED, INC, Waltham, MA (US)

( * ) Notice: Subject to any disclaimer, the term of this patent is extended or adjusted under 35 U.S.C. 154(b) by 213 days.

(21) Appl. No.: 18/225,321

(22) Filed: Jul. 24, 2023

(65) Prior Publication Data

US 2024/0025125 A1  Jan. 25, 2024

Related U.S. Application Data

(60) Provisional application No. 63/369,323, filed on Jul. 25, 2022.

(51) Int. Cl.
*B29C 64/40* (2017.01)
*B29K 79/00* (2006.01)
*B33Y 10/00* (2015.01)

(52) U.S. Cl.
CPC .............. *B29C 64/40* (2017.08); *B33Y 10/00* (2014.12); *B29K 2079/085* (2013.01)

(58) Field of Classification Search
CPC ....... B29C 64/40; B29C 64/118; B33Y 10/00; B33Y 70/00; B29K 2079/085
See application file for complete search history.

(56) References Cited

U.S. PATENT DOCUMENTS

| | | | |
|---|---|---|---|
| 2008/0124464 A1* | 5/2008 | Kritchman | B29C 64/112 427/265 |
| 2016/0136903 A1* | 5/2016 | Herran | B29C 64/118 264/308 |
| 2019/0270254 A1* | 9/2019 | Mark | B29C 64/118 |
| 2020/0061914 A1* | 2/2020 | Onishi | B29C 64/393 |
| 2022/0031435 A1* | 2/2022 | Shitrit | A61C 13/34 |
| 2024/0351291 A1* | 10/2024 | Voss | B29C 64/40 |

\* cited by examiner

*Primary Examiner* — Xiao S Zhao
*Assistant Examiner* — Inja Song
(74) *Attorney, Agent, or Firm* — PEARL COHEN ZEDEK LATZER BARATZ LLP

(57) ABSTRACT

Methods of reducing warping of a printed part are disclosed. The method includes depositing a raft comprising a first printable material onto a build platen of a three-dimensional printer. The method includes depositing a support material comprising a second printable material onto the raft. The method further includes depositing an anchor comprising one or more anchor shells of the first printable material onto the raft. The anchor is deposited within the support material. The method further includes printing a part made from the first material above the support material. The securing the part to the anchor by depositing one or more skirt shells comprising the first printable material about the periphery of the part and onto the anchor. The anchor has substantially the same shape as the part.

20 Claims, 3 Drawing Sheets

ANCHORS AND SKIRTS TO REDUCE PART WARPING

CROSS-REFERENCE TO RELATED APPLICATIONS

This application claims priority under 35 U.S.C. § 119(e) to U.S. Provisional Application Ser. No. 63/369,323, titled "Anchors and Skirts to Reduce Part Warping" filed Jul. 25, 2022, which is incorporated herein by reference in its entirety for all purposes.

FIELD OF TECHNOLOGY

Aspects and embodiments disclosed herein relate to methods for manufacturing a part additive manufacturing with reduced part warping.

SUMMARY

In accordance with an aspect, there is provided a method of reducing warping of a printed part. The method may include depositing a raft comprising a first printable material onto a build platen of a three-dimensional printer. The method may include depositing a support material comprising a second printable material onto the raft. The method further may include depositing an anchor comprising one or more anchor shells of the first printable material onto the raft. The anchor may be deposited within the support material. The method further may include printing a part comprising the first printable material above the support material. The method additionally may include securing the part to the anchor by depositing one or more skirt shells comprising the first printable material about the periphery of the part and onto the anchor.

In some embodiments, the anchor may have substantially the same shape as the periphery of the part.

In some embodiments, the first printable material is different than the second printable material.

In some embodiments, the raft has at least one linear dimension, e.g., one or both of a linear dimension along the X-axis and/or along the Y-axis, greater than that of the support material. In some embodiments, a number of brim shells that form a periphery of the raft is at least two. For example, the number of brim shells should be chosen such that the brim provide sufficient resistance in the Z-direction to reduce the likelihood that the part connected to the raft by the anchor warps. In certain embodiments, a height of the anchor is substantially the same as that of the deposited support material.

In some embodiments, a number of deposited anchor shells may be between 2 to 6, e.g., 2 anchor shells, 3 anchor shells, 4 anchor shells, 5 anchor shells, or 6 anchor shells. In some embodiments, an offset for each anchor shell of the anchor may be between 0.1 mm and 1.0 mm, e.g., 0.1 mm, 0.15 mm, 0.2 mm, 0.25 mm, 0.3 mm, 0.35 mm, 0.4 mm, 0.45 mm, 0.5 mm, 0.55 mm, 0.6 mm, 0.65 mm, 0.7 mm, 0.75 mm, 0.8 mm, 0.85 mm, 0.9 mm, 0.95 mm, or 1 mm. In some embodiments, a thickness for each anchor shell of the anchor may be between 0.1 mm and 1.0 mm, e.g., 0.1 mm, 0.15 mm, 0.2 mm, 0.25 mm, 0.3 mm, 0.35 mm, 0.4 mm, 0.45 mm, 0.5 mm, 0.55 mm, 0.6 mm, 0.65 mm, 0.7 mm, 0.75 mm, 0.8 mm, 0.85 mm, 0.9 mm, 0.95 mm, or 1 mm.

In some embodiments, a number of deposited skirt shells may be between 2 to 6, e.g., 2 skirt shells, 3 skirt shells, 4 skirt shells, 5 skirt shells, or 6 skirt shells. In some embodiments, an offset for each skirt shell may be between 0.1 mm and 1.0 mm, e.g., 0.1 mm, 0.15 mm, 0.2 mm, 0.25 mm, 0.3 mm, 0.35 mm, 0.4 mm, 0.45 mm, 0.5 mm, 0.55 mm, 0.6 mm, 0.65 mm, 0.7 mm, 0.75 mm, mm, 0.8 mm, 0.85 mm, 0.9 mm, 0.95 mm, or 1 mm. In some embodiments, a thickness for each skirt shell may be between 0.1 mm and 1.0 mm, e.g., 0.1 mm, 0.15 mm, 0.2 mm, 0.25 mm, mm, 0.35 mm, 0.4 mm, 0.45 mm, 0.5 mm, 0.55 mm, 0.6 mm, 0.65 mm, 0.7 mm, 0.75 mm, mm, 0.85 mm, 0.9 mm, 0.95 mm, or 1 mm.

In some embodiments, one or both of the one or more anchor shells and the one or more skirt shell may have a same fill pattern, e.g., solid, honeycomb, line, triangle, grid, cubic, octet, gyroid, and concentric fill pattern. Alternatively, one or both of the one or more anchor shells and the one or more skirt shells may have a different fill pattern.

In further embodiments, the method may include depositing a release material onto one or more of the brim, the support material, and the anchor. The release material may include a ceramic, a wax, a polymer, or a combination thereof.

In some embodiments, the first printable material may be polyetherimide (PEI). In some embodiments, the second printable material may be any printable material that resists adherence to the first printable material, e.g., PEI.

BRIEF DESCRIPTION OF THE DRAWINGS

The accompanying drawings are not drawn to scale. In the drawings, each identical or nearly identical component that is illustrated in the various figures is represented by a like numeral. For purposes of clarity, not every component may be labeled in every drawing. In the drawings:

FIG. 3A illustrates a raft and part printed without an anchor or skirt shells. FIG. 3B illustrates a raft and part printed without skirt shells but a larger anchor offset. FIG. 3C illustrates a raft and part printed without skirt shells but a smaller anchor offset. FIG. 3D illustrates a raft and part printed with a wide and tall anchor and skirt shells. FIGS. 3E and 3F illustrate a raft and part printed with a shorter and narrower anchor and skirt shells.

Figure 1:
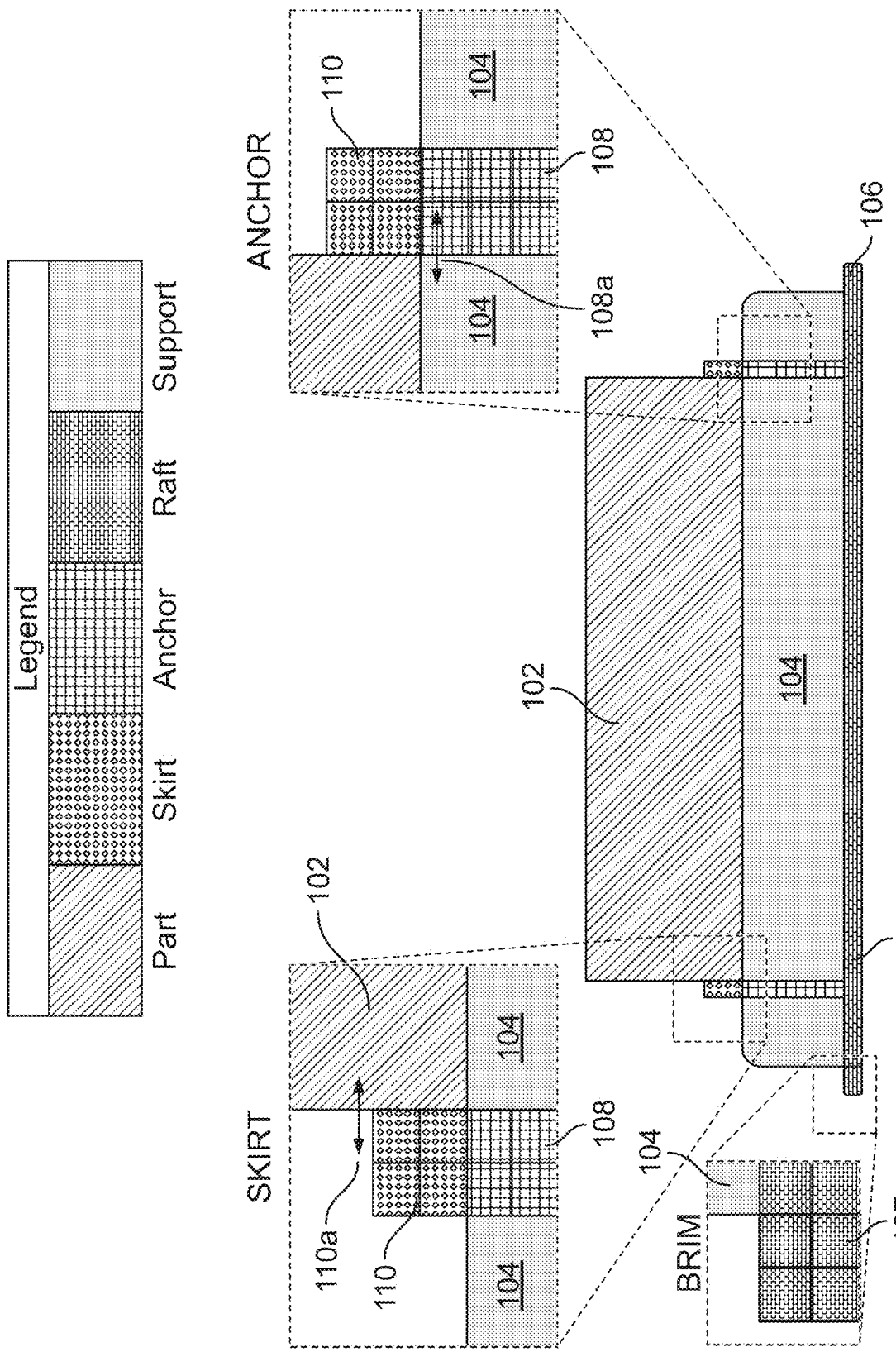
FIG. 1 illustrates a cross-section schematic of a printed raft, support material, part with the raft and part connected by an anchor and skirt shells, according to an embodiment.

The features and advantages of the disclosure are apparent from the detailed specification, and thus, it is intended that the appended claims cover all systems and methods falling within the true spirit and scope of the disclosure. As used herein, the indefinite articles "a" and "an" mean "at least one" or "one or more." Similarly, the use of a plural term does not necessarily denote a plurality unless it is unambiguous in the given context. Words such as "and" or "or" mean "and/or" unless specifically directed otherwise. In this application, the terms "comprising" and "including" may be understood to encompass itemized components or steps whether presented by themselves or together with one or more additional components or steps. Unless otherwise stated, the terms "about" and "approximately" may be understood to permit standard variation as would be understood by those of ordinary skill in the art. Where ranges are provided herein, the endpoints are included. As used in this application, the term "comprise" and variations of the term, such as "comprising" and "comprises," are not intended to exclude other additives, components, integers, or steps.

As used in this application, the terms "about" and "approximately" are used as equivalents. Any numerals used in this application with or without about/approximately are meant to cover any normal fluctuations appreciated by one of ordinary skill in the relevant art. In certain embodiments, the term "approximately" or "about" refers to a range of values that fall within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value).

Many methodologies described herein include a step of "determining." Those of ordinary skill in the art, reading the present specification, will appreciate that such "determining" can utilize or be accomplished through use of any of a variety of techniques available to those skilled in the art, including for example specific techniques explicitly referred to herein. In some embodiments, determining involves manipulation of a physical sample. In some embodiments, determining involves consideration and/or manipulation of data or information, for example utilizing a computer or other processing unit adapted to perform a relevant analysis. In some embodiments, determining involves receiving relevant information and/or materials from a source. In some embodiments, determining involves comparing one or more features of a sample or entity to a comparable reference.

As used herein, the term "substantially," and grammatic equivalents, refer to the qualitative condition of exhibiting total or near-total extent or degree of a characteristic or property of interest. One of ordinary skill in the art will understand that chemical phenomena rarely, if ever, go to completion and/or proceed to completeness or achieve or avoid an absolute result.

DETAILED DESCRIPTION

Additive manufacturing, sometimes more generally known as three-dimensional printing, refers to a class of technologies for the direct fabrication of physical products from a three-dimensional computer model by a layered manufacturing process. In contrast to material removal processes in traditional subtractive manufacturing, the three-dimensional printing process adds material. In additive manufacturing, 3D parts are manufactured by adding layer-upon-layer of material. For example, an additive manufacturing-based 3D printing device can create a 3D part, based on a digital representation of the part, by depositing a part material along toolpaths in a layer-by-layer manner. This process can enable the direct printing of products with extremely complex geometry.

Fused Deposition Modeling (FDM) also referred to as Fused Filament Fabrication (FFF) is an example of additive manufacturing technology used for modeling, production, and prototyping. In an FDM, FFF additive manufacturing process, a moving print head extrudes a filament of material onto a print bed or to an object being printed. The print head and/or the print bed can move relative to each other under computer control to define the printed object. Additive manufacturing of a layer generally involves slicing a two-dimensional layer into a series of shells, that is beads, lines, or shells that are stacked on top of one another (that is, along the z-axis) forming a digital representation of the intended part. The printing of a layer is typically done shell-by-shell on a build plate or print bed until the one or more shells (i.e., the plurality of shells) are complete, e.g., by incrementing the position of the print head relative to the substrate along one or more print axes. For example, each two-dimensional layer may have a number of shells lining a contour, such as a perimeter of a wall. This process can then be repeated to form an object, i.e., a three-dimensional part, resembling the digital representation. The process of depositing or extruding shells is typically in a machine-controlled manner according to slicing parameters. Additionally, for example, printing of subsequent shells may include extruding by tracing along a contour or path defined by a prior printed shell. A result of such a process can be a repeatable and consistent extrusion. Moreover, each two-dimensional layer may have a different fill pattern filling the interior of the part. Additionally, a fill pattern may be deposited between an inner and an outer perimeter of a wall.

In a fused deposition additive manufacturing system, a three-dimensional part or model may be printed from a digital representation of the three-dimensional part in a layer-by-layer manner by extruding a flowable part material along toolpaths.

The print head can move in two dimensions to deposit one horizontal plane or a layer of the object being printed. Then, the print head or the print bed can be moved vertically by a small amount to begin another horizontal plane, a new layer of the object. The part material is extruded through an extrusion tip carried by a print head of a three-dimensional printing apparatus, device, or system. Part material is deposited as a sequence of roads on a substrate in a build plane. A layer, for example, a first layer of a printable material is deposited (i.e., extruded) onto the build surface. That is, for example, a horizontal layer is printed with movement in the X-Y axis. Once this first horizontal layer is completed, a height adjustment is made in the Z axis. Another horizontal layer of is printed with movement in the X-Y axis. Once the next horizontal layer is completed, another height adjustment is made in the Z axis. This process continues, for each layer until the object is completed.

A material for the three-dimensional printing of parts intended to be used in high temperature applications is polyetherimide (PEI), of which a specific type of PEI referred to in the additive manufacturing industry is ULTEM™. PEI is a thermoplastic with high durability and excellent flame, smoke, and toxicity (FST) characteristics, making it suitable for use in demanding industries such as aerospace, defense, and other operations where durability and rigidity are needed. In part due to PEI's high glass transition temperature ($T_g$) of 422° F., parts printed with PEI are prone to warping off of the build platen of the 3D printer or other surface the part is being printed on, such as a release material, support material, a raft, or other similar platform, if not properly adhered. Warping of parts printed from PEI further occurs due to the accumulation of thermal stresses during the printing of the part that generates uplifting forces which tend to pull parts off flat foundations like the print bed or the deposited raft. PEI can be used to form adhesion features such as rafts; however, because it rapidly bonds when in contact with a PEI part, the part cannot be removed from a raft made of only PEI and typically needs an interface or a support material to prevent bonding. A support material for PEI that does not adhere to it often is used to form rafts. Despite this, the lack of adhesion between the PEI raft and part and the support material may not be sufficient to mitigate warping throughout the print because it is designed to be easily separated from the PEI part once complete. As used herein, a "raft" generally refers to a deposited flat foundational surface for printed parts to adhere to and is structured and arranged to create a strong adhesion layer from the print bed for the part to print on and keep the part flat during the printing process. The raft may be further secured to the build platen or print bed by the depositing of brim shells at the periphery of the raft. The warping failure mode becomes more frequent when the part being printed is a larger part that spreads over a large X-Y surface area of the build platen or platform, potentially due to thermal stability issues which ultimately results in a variable bead or layer compression that warps the part. It is an object of this disclosure to provide for systems and methods for printing PEI parts that minimize warping during the printing process.

Figure 2A:
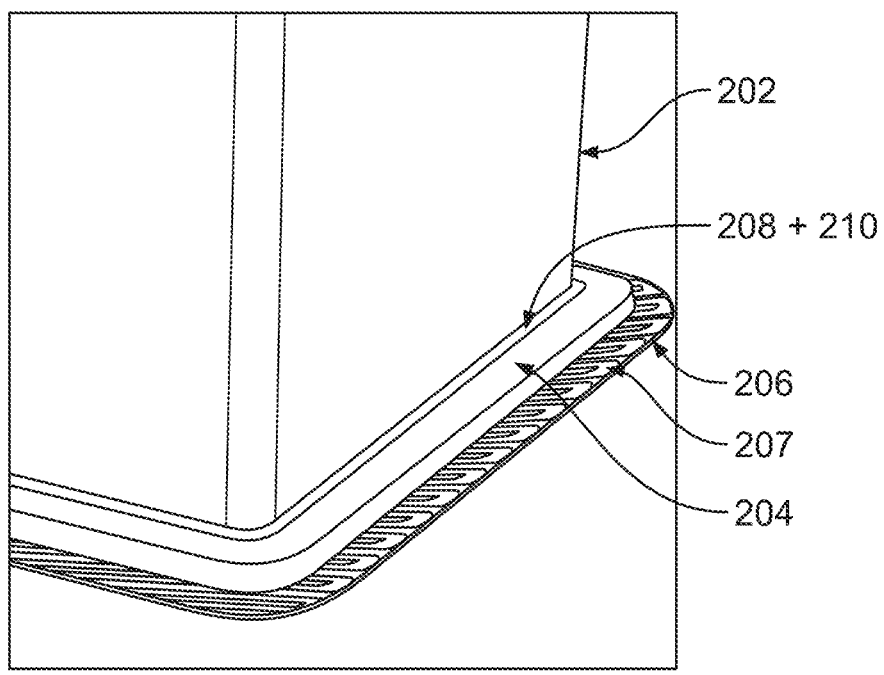
FIGS. 2A-2B illustrates a side and top-down views of a part printed using a method according to an embodiment of this disclosure.
Figure 2B:
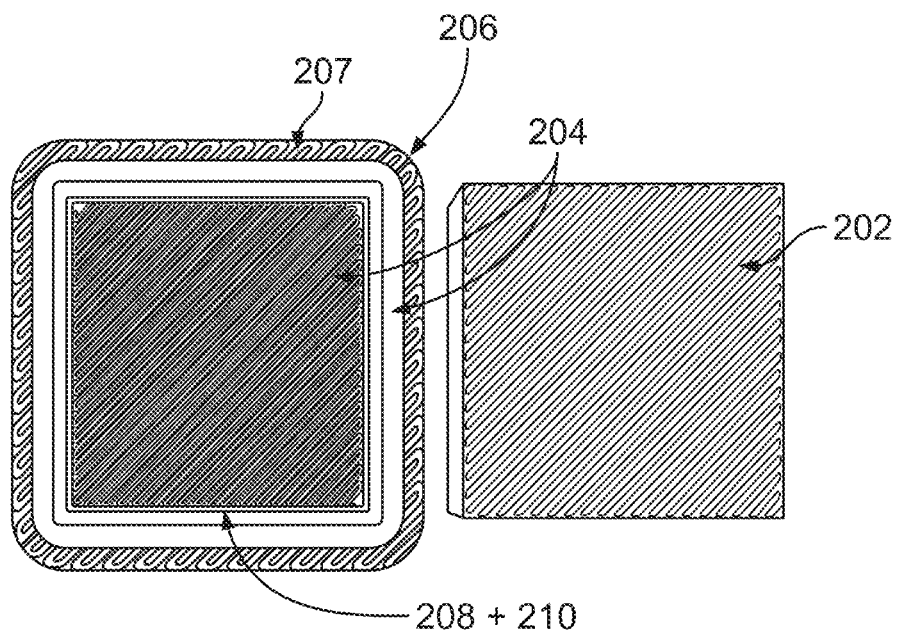

In order to improve the printing process for PEI and reduce part warping while permitting ease of part removal, different printing methodologies were tested. As illustrated in FIG. 1, for a print made using a raft 106 of PEI having brim shells 107 at its periphery, a support material 104 that does not substantially adhere to PEI, and a part 102 made from PEI, two securing strategies were investigated. The first securing strategy for reducing warping includes using anchors 108 to secure the part to the underlying raft 106 through the support 104 and connected to the first layer of the printed part 102. As further illustrated in FIG. 1, anchors 108 can be printed in layers up from the raft 106, with a total height of the anchor 108 at least as great as the support 104 it passes through, and having an anchor thickness, i.e., a linear width of each anchor shell. The anchors 108 can also have an anchor offset 108a, i.e., the X-Y position of the anchor 108 relative to the expected location of the part, herein illustrated as a double ended arrow. The anchor offset 108a, in combination with other variables, determines in part the adhesion between the part 102 and the raft 106. The first shell of the anchor 108 begins at the periphery of the part 102 and extends outward from that point; additional anchor shells extend outward from the first anchor shell at the periphery of the part 10. As illustrated in FIGS. 2A-2B, the whole of the part is printed above and within the space surrounded by the anchor filled with support material, which has substantially the same shape as the part, and the outermost edge of the part does not overlap the first shell of the anchor.

The second securing strategy for reducing warping includes using skirt shells 110, which are printed shell layers of PEI that are deposited at the periphery of the part 102 where it meets the anchor 108. As illustrated in FIG. 1, skirt shells 110 extend outward from the base of the part 102 towards the anchor 108 which does not overlap with the periphery of the part 102. The skirt shells 110 are constructed and arranged to attach a sidewall perimeter of the part 102, i.e., a sidewall of the periphery of the part, to the anchor, and thus to the entire raft 106. As with the anchor shells 108, the skirt shells 110 have a thickness, i.e., a width of the shells, and a skirt offset 110a, i.e., the X-Y position of the skirt shells 110 relative to the expected location of the part, herein illustrated as a double ended arrow, that can be adjusted to move the skirt shells 110 closer or farther from the sidewall of the part 102 to control the adhesion strength of the part 102 to the anchor 108 and thus the raft 106. Though only two layers of anchor shells 108 and skirt shells 110 are depicted, this is merely for illustrative purposes and the number of one or both of the anchor shells and skirt shells can be as many as needed in order to provide secure hold of the part to the raft.

Among other things, the present disclosure provides methods for reducing warping of a printed part. The method includes depositing a raft comprising a first printable material onto a build platen of a three-dimensional printer. The method includes depositing a support material comprising a second printable material onto the raft. The method further includes depositing an anchor comprising one or more anchor shells of the first printable material onto the raft. The anchor is deposited within the support material. The method further includes printing a part comprising the first material above the support material. The method additionally includes securing the part to the anchor by depositing one or more skirt shells comprising the first printable material about the periphery of the part and onto the anchor.

In some embodiments, the anchor can have substantially the same shape as the part. The anchor being substantially the same shape as the part provides for an even surface to deposit one or more skirt shells onto. This is not required, and other anchor shapes that provide a surface between part and support material are contemplated by this disclosure.

In some embodiments, the first printable material and the second printable material can be different materials. The materials used with the currently described three dimensional printing processes may incorporate any appropriate combination of materials. For example, appropriate polymers include, but are not limited to, acrylonitrile butadiene styrene (ABS), epoxy, vinyl, nylon, polyetherimide (PEI), polyether ether ketone (PEEK), polylactic Acid (PLA), nylon, PMMA, polyvinyl chloride, polypropylene, polystyrene, polytetrafluoroethylene (PTFE), low-density polyethylene, and high-density polyethylene. In specific embodiments, one or both of the first printable material is PEI. In the context of this disclosure, the second material may be any suitable printable material that does not substantially adhere to the first printable material, thus facilitating removal of the printed part from the support material after a printing process is complete.

As described herein, the raft is deposited directly onto the build platen or a print bed of a 3D printer. The support material and the anchor are deposited onto the raft, and in general, the raft has at least one greater linear dimension, e.g., along the X-axis and/or the Y-axis than both the printed part and the deposited support material. For example, as illustrated in FIGS. 2A-2B, the raft 206 has a greater width than the support 204 which has a greater width than the part 202 due to the one or more brim shells 207 positioned at the periphery of the raft 206; in this configuration, the part 202 can be secured to the raft using an anchor 208 and skirt shells 210 positioned at the periphery of the part 202 and passing through the support 204 down to the raft 206 with sufficient raft material flanking the periphery of the support 204 to provide a secure hold of the anchor 208 and skirt 210 and thus the part 202. The raft 206 comprising one or more brim shells 207 that extend past the periphery of the support 204 can have any suitable number of shells sufficient to hold the raft 206 to the anchor 208, skirt, 210, and part 202 and can scale with the size of the part and/or support material. In some embodiments, a number of brim shells 207 forming the periphery of the raft is at least two, but can be as many as needed as determined by one of skill in the art.

In some embodiments, a height of the anchor is substantially the same as that of the deposited support material. In general, the height or thickness, e.g., in the Z-direction, of the anchor is chosen such that the anchor can form a rigid surface for the skirt and part bottom to adhere to. Without wishing to be bound by any particular theory, setting the anchor layer height or thickness, e.g., in the Z-direction, substantially the same as that of the support material provides further support to the part because of the adhesive strength between the part, anchor, and raft, all made from the same first printable material, e.g., PEI. In this configuration, as the anchor has the same peripheral profile as the part being printed, the anchor acts in a manner akin to the vertical member of an I-beam, rigidly connecting the raft, e.g., the lower horizontal member of an I-beam, and the bottom of the part, e.g., the upper horizontal member of the I-beam, with the support material filling in the spaces around the I-beam to impart sag and deformation resistance to the part as it is printed.

In some embodiments, a number of deposited anchor shells is between 2 to 6, e.g., 2 anchor shells, 3 anchor shells, 4 anchor shells, 5 anchor shells, or 6 anchor shells. In some embodiments, in some embodiments, a thickness, e.g., width, for each anchor shell of the anchor may be between 0.1 mm and 1.0 mm, e.g., 0.1 mm, 0.15 mm, 0.2 mm, 0.25 mm, 0.3 mm, 0.35 mm, 0.4 mm, 0.45 mm, 0.5 mm, 0.55 mm, 0.6 mm, 0.65 mm, 0.7 mm, 0.75 mm, 0.8 mm, 0.85 mm, 0.9 mm, 0.95 mm, or 1 mm. In some embodiments, in some embodiments, an offset for each anchor shell of the anchor may be between 0.1 mm and 1.0 mm, e.g., 0.1 mm, 0.15 mm, 0.2 mm, 0.25 mm, 0.3 mm, 0.35 mm, 0.4 mm, 0.45 mm, 0.5 mm, 0.55 mm, 0.6 mm, 0.65 mm, 0.7 mm, 0.75 mm, 0.8 mm, 0.85 mm, 0.9 mm, 0.95 mm, or 1 mm. Without wishing to be bound by any particular theory, it is believed that the number of anchor layers, the width of each anchor shell, and the offset of the anchor is correlated to the decrease in warping of the support material and/or part being printed. In general, a greater number of anchor shells, a deeper anchor, and a lower offset results in decreased warping of the support material and/or part being printed, up to a practical limit for physical space considerations, ease of removal of the support material and/or part, and/or time needed to print the anchor.

As disclosed herein, when a support material is deposited onto the raft, a part can be deposited above the support material and to the inside of the anchor. The part can be secured to the anchor depositing one or more skirt shells about the periphery of the part that contact the sidewall of the part and the anchor. The skirt shells disclosed herein share many of the same considerations for dimensions as the deposition of the anchor shell of the anchor. For example, in some embodiments, the number of deposited skirt shells is at least two, e.g., the number of deposited skirt shells may be between 2 to 6, e.g., 2 skirt shells, 3 skirt shells, 4 skirt shells, 5 skirt shells, or 6 skirt shells. Further, in some embodiments, in some embodiments, a thickness, i.e., width, for each skirt shell of the one or more skirt shells may be between 0.1 mm and 1.0 mm, e.g., 0.1 mm, 0.15 mm, 0.2 mm, 0.25 mm, 0.3 mm, 0.35 mm, 0.4 mm, 0.45 mm, 0.5 mm, mm, 0.6 mm, 0.65 mm, 0.7 mm, 0.75 mm, 0.8 mm, 0.85 mm, 0.9 mm, 0.95 mm, or 1 mm. In some embodiments, an offset for the skirt shells may be between 0.1 mm and 1.0 mm, e.g., 0.1 mm, 0.15 mm, 0.2 mm, 0.25 mm, 0.3 mm, 0.35 mm, 0.4 mm, 0.45 mm, 0.5 mm, 0.55 mm, 0.6 mm, 0.65 mm, 0.7 mm, 0.75 mm, 0.8 mm, 0.85 mm, 0.9 mm, 0.95 mm, or 1 mm.

As with the anchor, the number, thickness, and offset of the skirt shells, in addition to how much of the skirt shells contact the anchor may determine the strength of the hold between the raft and the part, and thus the degree of warping with consideration about ease of removal. In general, it is not necessary for the height or thickness, e.g., in the Z-direction, of the skirt shells to be substantially the same as that of the part being secured using the skirt shells, though this disclosure contemplates such an arrangement. In particular embodiments, the skirt shells can be printed to provide for a seal between the periphery of the part and the anchor such that the skirt shells can be removed by tearing the skirt shell from the periphery of the part. In this configuration, the skirt may include a projection, such as a tab or a pull, that overhangs the periphery of the part at one edge and can be grasped and removed akin to the seal on a bottle. One of skill in the art would be able to determine the necessary height or thickness, e.g., in the Z-direction, of the skirt shell layers for the part being printed.

The fill pattern chosen for one or both of the anchor shells and the skirt shells may determine the relative strength and stiffness of the anchor and the skirt shells, and thus control the warping of the part being printed. In general, one or both of the anchor shells and the skirt shells can be printed using a solid fill pattern or a partially filled fill pattern. Without wishing to be bound by any particular theory, solid fill for printed objects generally exhibit the highest strength but use more material and increase printing time. Partially filled fill patterns, e.g., honeycomb, line, triangle, grid, cubic, octet, gyroid, and concentric fill patterns, are printed with solid walls and spaces within the object being printed. These types of fill patterns can provide directional strength, reduce the amount of material used in printing, and are faster to print. In some embodiments, one or both of the anchor shells and the one or more skirt shells can have a same fill pattern, e.g., all solid fill or all are a type of partially filled fill pattern. Alternatively, in other embodiments, one or both of the anchor shells and the one or more skirt shells can have a different fill pattern. For example, a part could be secured to the anchor using skirt shells with solid fill at the point of most stress, e.g., the first skirt shell, to maximize hold between the part and the anchor and the skirt shells that will experience lower warping forces can be printed with a partially filled fill pattern. Similar choices for fill patterns can be made for the anchor shells down to the raft or the build surface. One of skill in the art would readily be able to determine appropriate fill patterns for the anchor shells and the one or more skirt shells and this disclosure is in no way limited by the embodiments disclosed herein.

In further embodiments, methods of this disclosure can include depositing a release material onto one or more of the raft, the anchor, and the support material. Release materials in general help facilitate removal of the parts by providing a dissimilar interface between components that can be readily separated with applied mechanical force. Examples of suitable release materials include, but are not limited to, ceramic, a wax, a polymer, or combinations thereof. For example, the release materials may be in a liquid form that can be applied, e.g., dipped, brushed, or sprayed, to the raft, the anchor, and/or the support material.

EXAMPLES

The function and advantages of these and other embodiments can be better understood from the following examples. These examples are intended to be illustrative in nature and are not considered to be in any way limiting the scope of the invention.

FIGS. 3A-3F illustrate the results of printing a part onto a raft using the methods disclosed herein, e.g., using an anchor and skirt shells to secure the part to the raft to reduce warping and facilitate removal of the part following printing.

Example 1

Figure 3A:
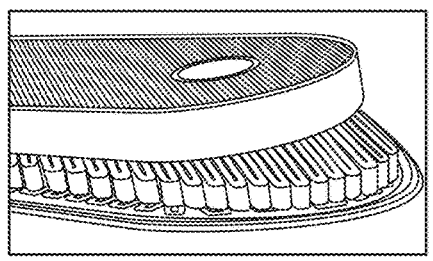
FIGS. 3A-3F illustrate parts printed using methods of this disclosure.

FIG. 3A illustrates a part printed on top of a support material that was printed directly above a raft, i.e., no anchors or skirt shells were printed. The part and the raft are made from PEI and the support material is made from a material with reduced adherence to PEI. The printing of this part was unacceptable, as the part completely warped off of the raft as seen in FIG. 3A by the angled gap above the support material. Deposition onto only the support material without a connection between the part and the underlying raft was not sufficient at providing enough adhesion strength to resist part warping.

Example 2

Figure 3B:
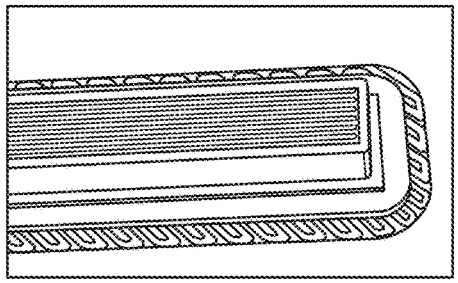

FIG. 3B illustrates a raft and part printed with an anchor but without skirt shells. The part and the raft are made from PEI and the support material is made from a material with reduced adherence to PEI. In the printed part shown in FIG. 3B, the anchor was printed 20 layers deep with three anchor shells, with the three anchor shells offset at −0.6 mm, −0.8 mm, and 1.0 mm, respectively, from the periphery of the part, i.e., in direct contact with the part. This configuration was considered unsuccessful as the part fused to the raft and could not be removed. It was determined that, in at least one embodiment, having the anchor located at an offset less than −0.5 mm resulted in too much adhesion between the part and anchor in the raft, making part removal difficult.

Example 3

Figure 3C:
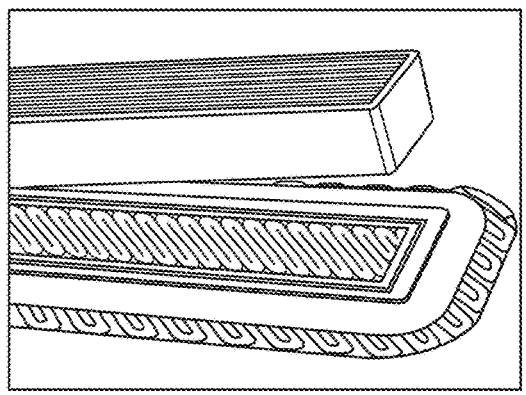

FIG. 3C illustrates a raft and part printed with an anchor but without skirt shells. The part and the raft are made from PEI and the support material is made from a material with reduced adherence to PEI. In the printed part shown in FIG. 3C, the anchor was printed 20 layers deep with three anchor shells, with the three anchor shells offset at −0.3 mm, −0.4 mm, and −0.5 mm, respectively, from the periphery of the part, i.e., in direct contact with the part. This configuration was considered unsuccessful even though the part did not warp and was successfully removed from the raft. As is seen in FIG. 3C, the underside of the part was damaged, as evidenced by the fraying of the PEI during removal of the raft, indicating that the adhesion between the part and raft via the anchor was too strong.

Example 4

Figure 3D:
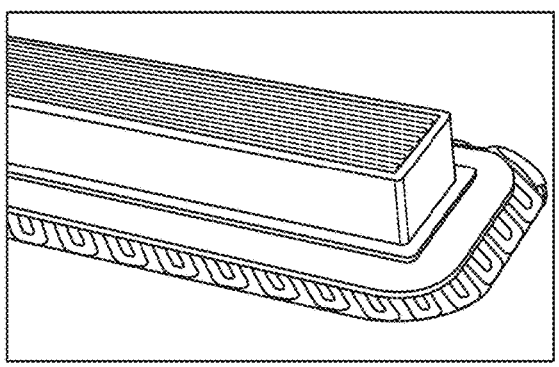

FIG. 3D illustrates a raft and part printed with both an anchor and skirt shells. The part and the raft are made from PEI and the support material is made from a material with reduced adherence to PEI. In the printed part shown in FIG. 3D, the anchor was printed 20 layers deep with four anchor shells, each having an offset of −0.5 mm from the periphery of the part, i.e., in direct contact with the part. The skirt shells were printed in two layers of shells, each layer having four shells with a thickness of 0.25 mm with no offset from the part. This configuration was considered unsuccessful as the part fused to the raft and could not be removed. It was determined that, in at least one embodiment, having the anchor located at an offset −0.5 mm with substantial skirt shells securing the part to the anchor resulted in too much adhesion between the part and anchor in the raft, making part removal difficult.

Example 5

Figure 3E:
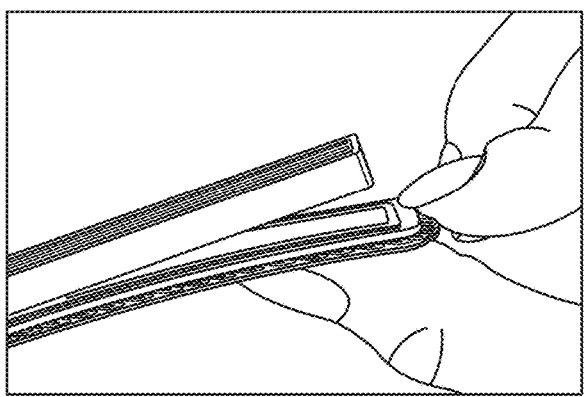
Figure 3F:
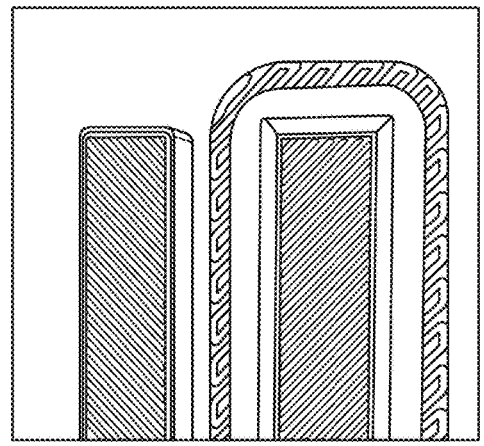

FIGS. 3E-3F illustrate a raft and part printed with both an anchor and skirt shells. The part and the raft are made from PEI and the support material is made from a material with reduced adherence to PEI. In the printed part shown in FIGS. 3E-3F, the anchor was printed nine layers deep with four anchor shells, each having an offset of 0.2 mm from the periphery of the part, i.e., the anchors did not contact the part. The skirt shells were printed in two layers of shells, each layer having four shells with a thickness of 0.25 mm with no offset from the part. This was a successful print, as the part did not warp and the part was readily removed from the raft and anchor without damage. This was attributed to the skirt shells and anchor adhesion have sufficient adhesion to resist part warp and the lack of contact between the bottom of the part and the anchor.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated that various alterations, modifications, and improvements will readily occur to those skilled in the art. Any feature described in any embodiment may be included in or substituted for any feature of any other embodiment. Such alterations, modifications, and improvements are intended to be part of this disclosure and are intended to be within the scope of the invention. Accordingly, the foregoing description and drawings are by way of example only.

Those skilled in the art should appreciate that the parameters and configurations described herein are exemplary and that actual parameters and/or configurations will depend on the specific application in which the disclosed methods and materials are used. Those skilled in the art should also recognize or be able to ascertain, using no more than routine experimentation, equivalents to the specific embodiments disclosed.

What is claimed is:

1. A method of reducing warping of a printed part, comprising:
    depositing a raft comprising a first printable material onto a build platen of a three-dimensional printer;
    depositing a support material comprising a second printable material onto the raft;
    depositing an anchor comprising one or more anchor shells of the first printable material onto the raft, the anchor being deposited within the support material;
    printing a part comprising the first printable material above the support material; and
    securing the part to the anchor by depositing one or more skirt shells comprising the first printable material about a periphery of the part and onto the anchor.

2. The method of claim 1, wherein the anchor has substantially the same shape as the periphery of the part.

3. The method of claim 1, wherein the first printable material is different than the second printable material.

4. The method of claim 1, wherein the raft has at least one linear dimension greater than that of the support material.

5. The method of claim 4, wherein a number of brim shells that comprise a periphery of the raft is at least two.

6. The method of claim 1, wherein the support material has at least one linear dimension greater than that of the part.

7. The method of claim 1, wherein a height of the anchor is substantially the same as that of the support material.

8. The method of claim 1, wherein a number of the one or more anchor shells is between 2 to 6.

9. The method of claim 8, wherein a thickness for each of the one or more anchor shells is between 0.1 mm and 1.0 mm.

10. The method of claim 8, wherein an offset for each of the one or more anchor shells is between 0.1 mm and 1.0 mm.

11. The method of claim 1, wherein the one or more skirt shells are deposited about the periphery of the part completely.

12. The method of claim 1, wherein a number of the one or more skirt shells is between 2 to 6.

13. The method of claim 12, wherein an offset for each of the one or more skirt shells is between 0.1 mm and 1.0 mm.

14. The method of claim 12, wherein a thickness for each of the one or more skirt shells is between 0.1 mm and 1.0 mm.

15. The method of claim 1, wherein one or both of the one or more anchor shells and the one or more skirt shells have a same fill pattern.

16. The method of claim 1, wherein one or both of the one or more anchor shells and the one or more skirt shells have a different fill pattern.

17. The method of claim 1, further comprising depositing a release material onto one or more of the raft, the support material, and the anchor.

18. The method of claim 17, wherein the release material comprises a ceramic, a wax, a polymer, or a combination thereof.

19. The method of claim 1, wherein the first printable material is polyetherimide (PEI).

20. The method of claim 1, wherein the second printable material comprises a material that resists adherence to the first printable material.

* * * * *